(12) United States Patent
Lee et al.

(10) Patent No.: US 9,386,099 B2
(45) Date of Patent: *Jul. 5, 2016

(54) LOCAL CACHING DEVICE, SYSTEM AND METHOD FOR PROVIDING CONTENT CACHING SERVICE

(71) Applicant: SK Telecom Co., Ltd., Seoul (KR)

(72) Inventors: Jong Min Lee, Seongnam-si (KR); Kyung Jun Lee, Seongnam-si (KR); A Rum Kwon, Gwangju (KR); Young Jae Shim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 267 days.

This patent is subject to a terminal disclaimer.

(21) Appl. No.: 13/903,245

(22) Filed: May 28, 2013

(65) Prior Publication Data

US 2013/0326026 A1 Dec. 5, 2013

(30) Foreign Application Priority Data

Jun. 1, 2012 (KR) .................. 10-2012-0059291

(51) Int. Cl.
*G06F 15/16* (2006.01)
*H04L 29/08* (2006.01)

(52) U.S. Cl.
CPC ........ *H04L 67/1097* (2013.01); *H04L 67/2842* (2013.01)

(58) Field of Classification Search
None
See application file for complete search history.

(56) References Cited

U.S. PATENT DOCUMENTS

| | | | | |
|---|---|---|---|---|
| 5,906,000 A | * | 5/1999 | Abe | ............... G06F 12/122 711/133 |
| 5,991,306 A | * | 11/1999 | Burns et al. | ............... 370/429 |
| 6,128,655 A | * | 10/2000 | Fields et al. | ............... 709/219 |
| 2005/0102427 A1 | * | 5/2005 | Yokota | ............... H04L 67/1002 709/245 |
| 2007/0050491 A1 | * | 3/2007 | Kataoka | ............... H04L 67/2814 709/223 |
| 2011/0208828 A1 | * | 8/2011 | Sakakihara | ............... G06F 17/30545 709/217 |
| 2012/0030212 A1 | * | 2/2012 | Koopmans et al. | ............... 707/741 |
| 2012/0117201 A1 | * | 5/2012 | Arolovitch | ............... G06F 17/30902 709/219 |
| 2012/0166806 A1 | * | 6/2012 | Zhang | ............... H04L 9/3247 713/176 |
| 2012/0191804 A1 | * | 7/2012 | Wright et al. | ............... 709/217 |
| 2014/0310374 A1 | * | 10/2014 | Lee | ............... H04L 45/02 709/213 |

FOREIGN PATENT DOCUMENTS

| | | | |
|---|---|---|---|
| KR | 1020050001422 A | 1/2005 |
| KR | 1020080007439 A | 1/2008 |
| KR | 1020100058786 A | 6/2010 |
| KR | 1020110014120 A | 2/2011 |

OTHER PUBLICATIONS

Chinese Office Action for application No. 201310195067.0 dated Aug. 26, 2015. (U.S. references 5991306, 6128655, and 20120030212 were previously cited by the Examiner in the Office Action for U.S. Appl. No. 13/903,245, dated May 26, 2015.).

* cited by examiner

*Primary Examiner* — Peling Shaw
(74) *Attorney, Agent, or Firm* — Hauptman Ham, LLP

(57) ABSTRACT

The present disclosure relates to a local caching device, system and a method for providing a content caching service. The local caching device checks whether content having address information corresponding to content address information included in a content request message is stored in a storage unit. When the content corresponding to content address information is not stored in the storage unit, the local caching device receives content transmitted from a content providing device in response to the content request message and then checks whether content corresponding to at least part of the received content is stored in the storage unit.

18 Claims, 5 Drawing Sheets

LOCAL CACHING DEVICE, SYSTEM AND METHOD FOR PROVIDING CONTENT CACHING SERVICE

CROSS-REFERENCE TO RELATED APPLICATION

This application claims priority to and benefit of Patent Application Serial No. 10-2012-0059291, filed on Jun. 1, 2012 in Korea, which is hereby incorporated by reference herein in its entirety.

FIELD

The present disclosure relates to a local caching device, system and method for providing a content caching service to prevent redundant content transmission on a network.

BACKGROUND

The statements in this section merely provide background information related to the present disclosure and are not admitted as prior art.

With propagation of smartphones with improved performance and abrupt increase in the number of content providers on the basis of the propagation of smartphones, traffic of mobile communication networks increases, resulting in service quality deterioration due to a decrease in download speed and a transmission rate of content such as video, audio, images, applications, etc.

With the development of content transmission technologies, large-capacity file transmission can be achieved when online video services such as VOD (Video On Demand), live streaming, etc. are provided or music streaming, file upload and download, etc. are performed, and thus various services for delivering large-capacity content are provided.

However, these content providing services deliver redundant content to users in the same domain or the same radio coverage in general although the frequency of delivery of content depends on the popularity of the content, and transmitted content is beginning to represent an increasing share of network traffic as the content providing services are increasingly used.

In a situation that traffic of a communication network abruptly increases due to transmission of large-capacity content, the inventor(s) has experienced that transmission of redundant content further increases a traffic load of the communication network.

In view of this, a CDN (Content Delivery Network) service stably delivers various types of content including moving images such as movies, music video, etc. to users. The CDN service is implemented in such a manner that content is stored in a plurality of local caching devices distributed in a network, a most suitable cache server is selected from a plurality of cache servers through a load balancer such as a GLB (Global Load Balance) server and requested content is delivered to a user equipment through the selected cache server.

The CDN was implemented on the basis of the Internet in order to solve problems including data loss, bottlenecks, transmission rate decrease, instability such as discontinuous data transmission, etc.

Content caching is a technology of selectively caching content in a plurality of local caching devices distributed in a network in the CDN service. Content caching is performed in consideration of the size of a storage space of a local caching device. Furthermore, the inventor(s) has noted that it is necessary to consider a time required to determine whether cached content includes content corresponding to content requested by a user and a cache hit rate corresponding to the rate at which content requested by a user corresponds to cached content.

SUMMARY

In accordance with some embodiments, the local caching device comprises a storage unit, a communication interface and a controller. The storage unit is configured to store some or all content provided by at least one content providing device to at least one user equipment. The communication interface is configured to transmit and receive data between the at least one content providing device and the at least one user equipment. And the controller is configured to request the at least one content providing device to transmit content requested by the at least one user equipment when the requested content is not stored in the storage unit, receive from the at least one content providing device the requested content requested to the at least one content providing device, and check whether content corresponding to at least part of the received content is stored in the storage unit.

In accordance with some embodiments, the local caching device is configured to perform a method for providing a content caching service. The local caching device is configured to extract content address information from a content request message transmitted from a user equipment, request a content providing device to provide content having address information corresponding to the extracted content address information to receive the content when the content is not stored in the local caching device, check whether content stored in the local caching device corresponds with at least part of the content received from the content providing device.

In accordance with some embodiments, a system for providing a content caching service comprises at least one content providing device and a local caching device. The at least one content providing device is configured to transmit content requested by at least one user equipment when receiving a request to transmit the content. The local caching device is configured to store some or all content provided by at least one content providing device to at least one user equipment, transmit and receive data between the at least one content providing device and the at least one user equipment, request the at least one content providing device to transmit the content requested by the at least one user equipment when the requested content is not stored in the storage unit, receive from the at least one content providing device the requested content, and check whether content corresponding to at least part of the received content is stored in the storage unit.

DETAILED DESCRIPTION

In the following description, numerous specific details are set forth. However, it is understood that various embodiments of the disclosure are practiced without these specific details. In other instances, well-known functions or configurations have not been shown in detail in order not to obscure understanding of this description. The same reference numbers will be used throughout this specification to refer to the same or like parts.

To aid in understanding of the present disclosure, the terms used in the following description are defined as follows.

'Content address information' refers to the location of content in a network and may be a URL (Uniform Resource Locator) including a protocol type, the domain name or IP address of the content providing device, and a file path name of content, for example.

'Content identification information' is information for identifying content stored in a local caching device. Specifically, the content identification information refers to a value generated by extracting at least part of content from a content request message or processing (e.g. hashing) at least part of the content. That is, the content identification information is generated on the basis of at least part of content. For example, the content identification information includes at least one of prefix information having a predetermined length, a hash value obtained by processing the prefix information using a predetermined hash function, and metadata of the content.

'Content' can be consisting of, for example, text message, web content, video, audio, images, applications, and etc. 'Content' can be provided in a streaming or download manner. 'Content' can be divided into one or more part in a predetermined chunk unit and store at a single or multiple storages of at least one local caching device, at least one user equipment, and/or at least one content providing device.

Figure 1:
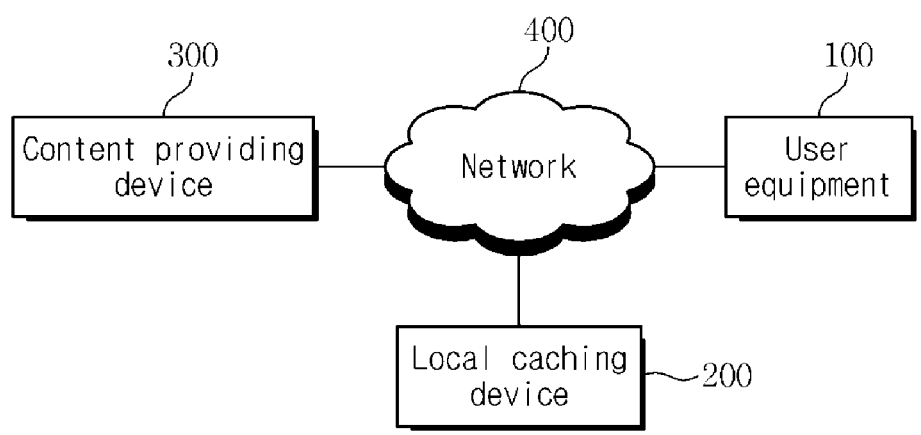
FIG. 1 is a schematic block diagram of a content caching service system according to at least one embodiment.

FIG. 1 is a schematic block diagram of a content caching service system according to at least one embodiment.

Referring to FIG. 1, the content caching service system includes at least one user equipment 100 (just shown as single user equipment in FIG. 1 for convenience), at least one local caching device 200 (just shown as single local cashing device in FIG. 1 for convenience) and at least one content providing device 300 (just shown as single content providing device in FIG. 1 for convenience), which are connected through a network 400.

The user equipment 100 is an equipment that is connected to the network 400 to use content provided through the network 400. The user equipment 100 requests the content providing device 300 to provide specific content and receives the request content or other content transmitted from the content providing device 300 or the local caching device 200 at the request of the user equipment 100. For example, the user equipment 100 can be any electronic/information communication device having a communication function, such as a desktop PC, notebook computer, tablet PC, smartphone, PDA (Personal Digital Assistant), Internet TV (smart TV), etc.

The local caching device 200 is located in or connect, by either wire or wireless to the network 400, stores content provided by the content providing device 300 temporarily or for a predetermined time and provides the stored content to the user equipment 100 in place of the content providing device 300 when the user equipment 100 requests the content. To achieve this, the local caching device 200 performs a caching operation of copying some or all content provided by the content providing device 300 to the user equipment 100 and storing the copied content using various caching schemes. In addition, when the user equipment 100 requests content, the local caching device 200 checks whether there is content cached therein that corresponds (or matches) with the content requested by the user equipment 100 by using address information of the requested content and/or using at least part of the content. More specifically, the local caching device 200 receives a content request message transmitted from the user equipment 100 to the content providing device 300 on the network 400 and firstly checks whether content having address information corresponding to content address information included in the content request message is stored. That is, the local caching device 200 checks whether the local caching device 200 stores content (i.e., content capable of being cached) equivalent to or matching to the content (i.e., requested content) requested by the user equipment 100 in such a manner of comparing content address information included in the content request message with each content address information of all content stored in the local caching device 200. When the content matched to the requested content is not stored in the local caching device 200, the local caching device 200 transmits the content request message to the content providing device 300, receives content (i.e., content requested through the content request message) transmitted from the content providing device 300 in response to the content request message of the user equipment 100, and secondly checks whether content corresponding to at least part of the received content is stored in the local caching device 200. When it is determined that the corresponding content is stored in the first or second checking process, the local caching device 200 transmits the stored content (i.e., content matched to the requested content) to the user equipment 100 in place of the content providing device 300. While a single local caching device 200 is illustrated in FIG. 1, the disclosure is not limited thereto and one or more local caching devices 200 are distributed in the network 400 in at least one embodiment.

The configuration and operation of the local caching device 200 will be described in detail with reference to FIGS. 3 and 4.

The content providing device 300 is a service providing device that provides various types of content, for example, video files, audio files, web pages, etc. through the network 400 in a streaming or download manner. The content providing device 300 is a server (e.g., a computer system) that provides video sharing sites through which a charged or free video is uploaded, viewed or shared, application stores through which mobile content is dealt, an IPTV broadcast service through the Internet, etc.

The network 400 through which content is transmitted among the user equipment 100, the local caching device 200 and the content providing device 300 includes communication networks currently used or expected to be used in the future and convergence networks corresponding to combinations of the communication networks. Specifically, the network 400 can include IP based wired/wireless communication networks such as the Internet. In addition, the network 400 can include not only mobile communication networks such as LTE (Long Term Evolution) networks and WCDMA networks but also various wireless networks such as Wi-Fi networks and mobile networks corresponding to combinations thereof. In this case, the local caching device 200 can be used to reduce redundant content transmission and traffic in a mobile network.

Figure 2:
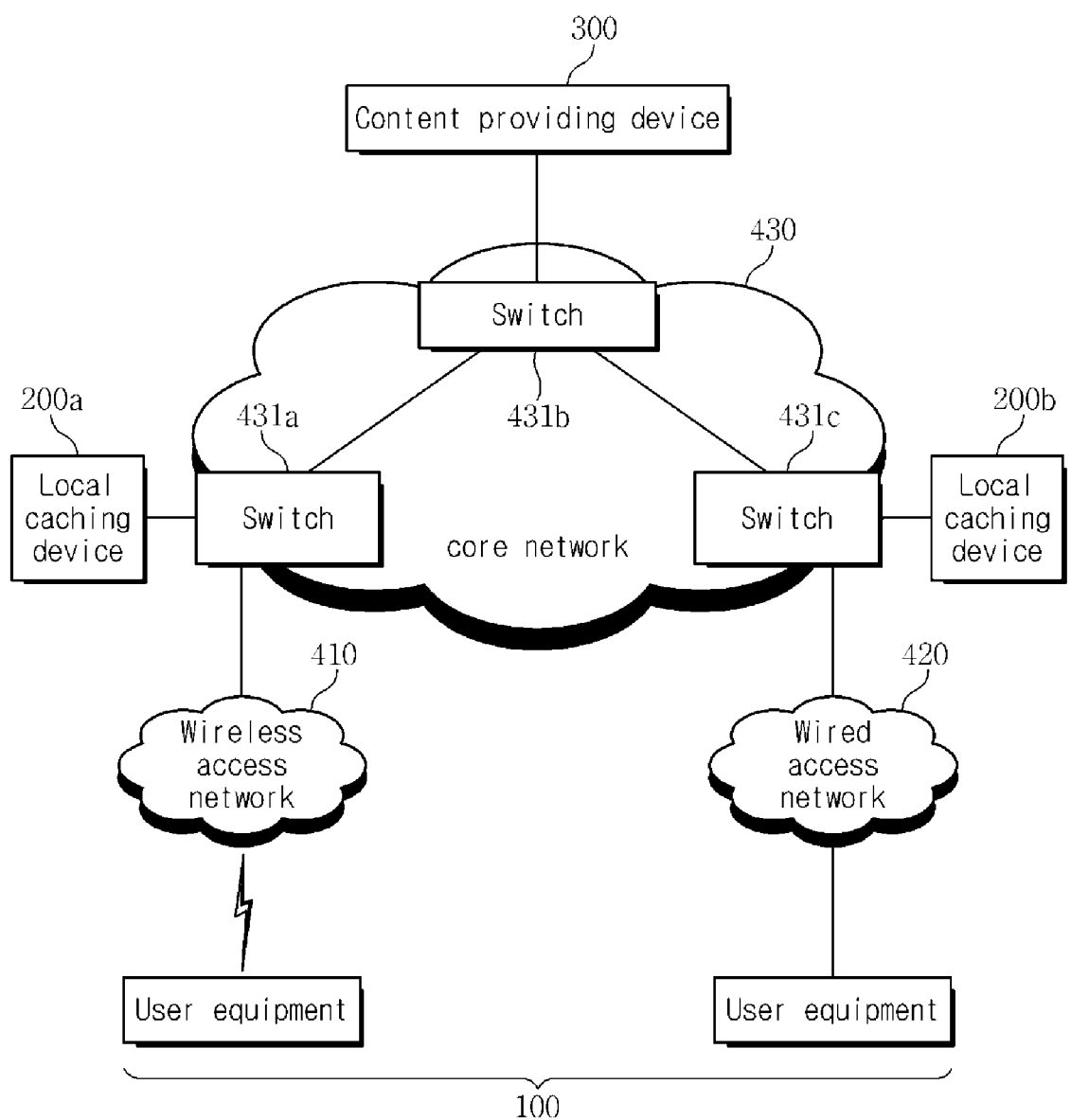
FIG. 2 is a schematic block diagram of a local caching device distribution structure in the content caching service system according to at least one embodiment.

FIG. 2 is a schematic block diagram of a structure of distribution of the local caching device 200 in the content caching service system according to at least one embodiment.

As described above, the local caching device 200 is distributed in the network 400 including at least one of a wired network and a wireless network.

Referring to FIG. 2, the network 400 includes one or more wireless or wired access networks 410 and 420 to which the user equipment 100 is connected and a core network 430 that connects the wireless or wired access networks 410 and 420.

The wireless access network 410 refers to a subscriber network capable of transmitting/receiving data to/from the user equipment 100 in various wireless communication manners and can include a mobile communication network and Wi-Fi network. The wired access network 420 refers to a subscriber network connected to the user equipment 100 in a wired manner to transmit/receive data to/from the user equipment 100 and can include FTTH.

The local caching devices 200 (200a and 200b) are distributed at edge nodes of the network 400. Specifically, the local caching devices 200a and 200b are connected to switches (e.g. routers, etc.) 431a, 431b and 431c linked to the wireless/wired access networks 410 and 420 of the core network 100 and provide the content caching service to the user equipment 100 connected to the wireless/wired access networks 410 and 420.

Particularly, when the content caching service according to the present disclosure is applied to a mobile network such as a mobile communication network, the local caching device 200 can be distributed in each wireless access network including a plurality of base stations such as base transceiver stations (BTSs), nodeBs, eNodeBs, etc. and a base station controller such as a radio network controller (RNC) in the mobile network. In this case, the local caching device 200 can be connected to an edge node (e.g. switch) of a mobile communication system connected to each wireless access network to support transmission of content to a user equipment connected to each wireless access network.

A description will be given of the configuration and operation of the local caching device 200 according to at least one embodiment of the present disclosure with reference to FIGS. 3 and 4.

Figure 3:
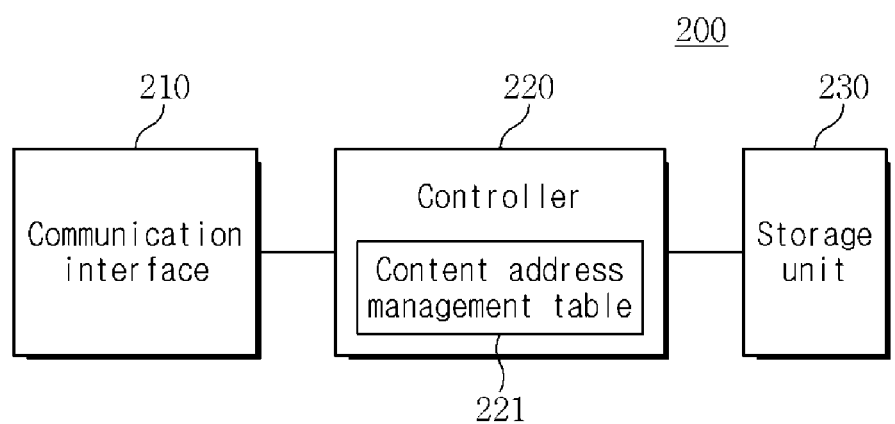
FIG. 3 is a schematic block diagram of a configuration of a local caching device according to at least one embodiment.
Figure 4:
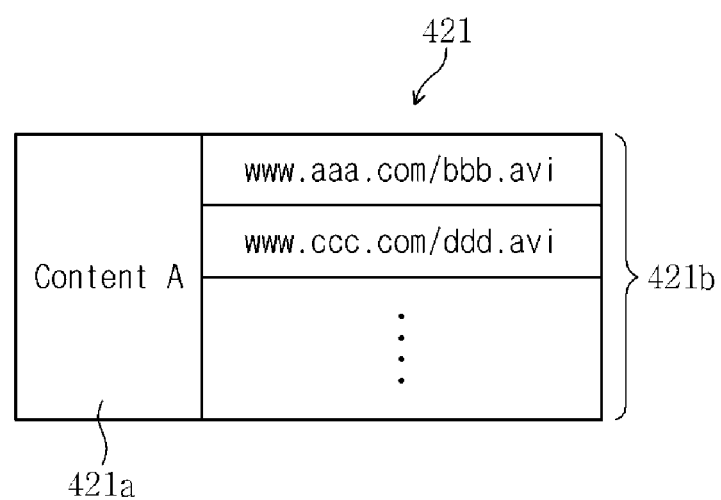
FIG. 4 is a schematic diagram of an exemplary content address management table managed by the local caching device according to at least one embodiment.

FIG. 3 is a block diagram of the configuration of the local caching device 200 (200a and 200b) according to at least one embodiment and FIG. 4 is a schematic diagram of an exemplary content address management table managed by the local caching device according to at least one embodiment.

Referring to FIG. 3, the local caching device 200 includes a communication interface 210, a controller 220 and a storage unit 230.

The communication interface 210 is connected to the network 400 to transmit/receive data through the network 400. According to at least one embodiment of the present disclosure, the communication interface 210 can be connected to the network 400 through which data is transmitted between at least one content providing device 300 and at least one user equipment 100 and transmit/receive data to/from the at least one content providing device 300 and the at least one user equipment 100 through the network 400. The communication interface 210 includes one or more communication modules that process transmission and reception in a wired or wireless manner according to the type of the network 400. The communication interface 210 also can communicate to each other and various networks including, but not limited to, cellular, Wi-Fi, LAN, WAN, CDMA, WCDMA, GSM, LTE and EPC networks, and cloud computing networks.

The controller 220 controls the overall caching service operation of the local caching device 200. Upon reception of a content request message from the user equipment 100 through the communication interface 210, the controller 220 compares content address information included in the content request message and at least part of content with cached content to determine whether content requested by the user equipment 100 is cached in the local caching device 200 and controls the local caching device 200 to transmit the cached content to the user equipment 100 in place of the content providing device 300 when the content is cached.

The storage unit 230 stores some or all content provided by the at least one content providing device 300 to the at least one user equipment 100.

More specifically, the controller 220 receives the content request message transmitted from the user equipment 100 to the content providing device 300 through the communication interface 210, checks whether content cached in the storage unit 230 includes (or matches to) content having address information corresponding to the content address information included in the content request message. The controller 220 transmits the content request message to the content providing device 300 to receive at least part of the content requested by the user equipment if the content having the address information corresponding to the content address information is not present in the storage unit 230. The controller 220 receives at least part of the content (i.e., requested content) transmitted from the content providing device 300 in response to the content request message, and checks (or determines) whether the content cached in the storage unit 230 includes content corresponding to the at least part of the content received from the content providing device 300.

Upon determining that the content cached in the storage unit 230 includes the content requested by the user equipment 100 in the first or second checking process, the controller 220 controls the local caching device 200 to transmit the corresponding content stored in the storage unit 230 to the user equipment 100 in place of the content providing device 300.

In addition, when the content cached in the storage unit 230 includes content corresponding to the at least part of the content received from the content providing device 300, the local caching device 200 can transmit, to the content providing device 300, a message that requests the content providing device 300 to interrupt transmission of the content such that the content providing device 300 does not transmit content any more. Here, the message requesting content transmission interruption is an HTTP RST (Reset) message and content transmission interruption request is selectively performed.

Furthermore, the controller 220 includes a content address management table 221 for managing one or more addresses respectively matched to content stored in the storage unit 230 in order to perform the above described first and second checking processes. The controller 220 checks whether the content cached in the storage unit 230 includes content corresponding to the content requested by the user equipment 100 with reference to the content address management table 221. That is, the controller 220 checks whether the corresponding content matching to the content requested by the user equipment 100 is stored in the storage unit.

Referring to FIG. 4, the content address management table 221 includes a first field 221a in which content identification information for identifying content stored in the storage unit 230 is recorded and a second field 221b in which one or more different addresses respectively matched to content corresponding to the content identification information are recorded.

The content identification information is generated by extracting at least part of corresponding content or processing (e.g. hashing) at least part of the content. The content identification information includes at least one of prefix information having a predetermined length (e.g. 128 KByte, 1 MByte, etc.) in the corresponding content, a hash value obtained by processing the prefix information using a predetermined hash function, and metadata such as a content length.

The controller 220 determines whether the content cached in the storage unit 230 includes content corresponding to the content requested by the user equipment 100 using the content address management table 221. That is, the controller 220 searches the content address management table 221 for content having address information corresponding to the content address information included in the content request message transmitted from the user equipment 100 in the first checking process. The controller 220 compares the at least part of the content received from the content providing device 300 with the content identification information of the content address management table 221 to check whether corresponding content matching to the content requested by the user equipment 100 is present in the storage unit 230 in the second checking process. When a hash value is used as the content identification information, a hashing operation is additionally performed on the at least part of the content received from the content providing device 300.

In addition, when the content cached in the storage unit 230 includes content corresponding to the at least part of the content received from the content providing device 300 in the second checking process, the controller 220 can add (or update) the content address information included in the content request message to the second field 221b of the content address management table 221 as new address information (i.e., another address information) of the corresponding content. Accordingly, when a content request using the newly added address information is generated, the controller 220 can extract cached content from the storage 230 and provide the extracted content to the user equipment 100 only through the first checking process of comparing content address information with address information of cached content.

When the content cached in the storage unit 230 does not include content corresponding to the at least part of the content received from the content providing device 300 in the second checking process, the controller 220 controls the local caching device 200 to transmit the content received from the content providing device 300 to the user equipment 100 and, simultaneously, to copy the received content and store the copied content in the storage unit 230.

In addition, the controller 220 generates content identification information about the content cached in the storage unit 230, newly registers the content identification information in the first field 221a of the content address management table 221, records content address information about the cached content in the second field 221b. The content identification information and content address information newly registered in this manner can be used to extract a content requested by the user equipment 100 for the same content. Other components of the local caching device 200, such as communication interface 210 and the controller 220 are implemented by one or more processors and/or application-specific integrated circuits (ASICs).

A description will be given of a content caching service process according to the present disclosure with reference to FIG. 5.

Figure 5:
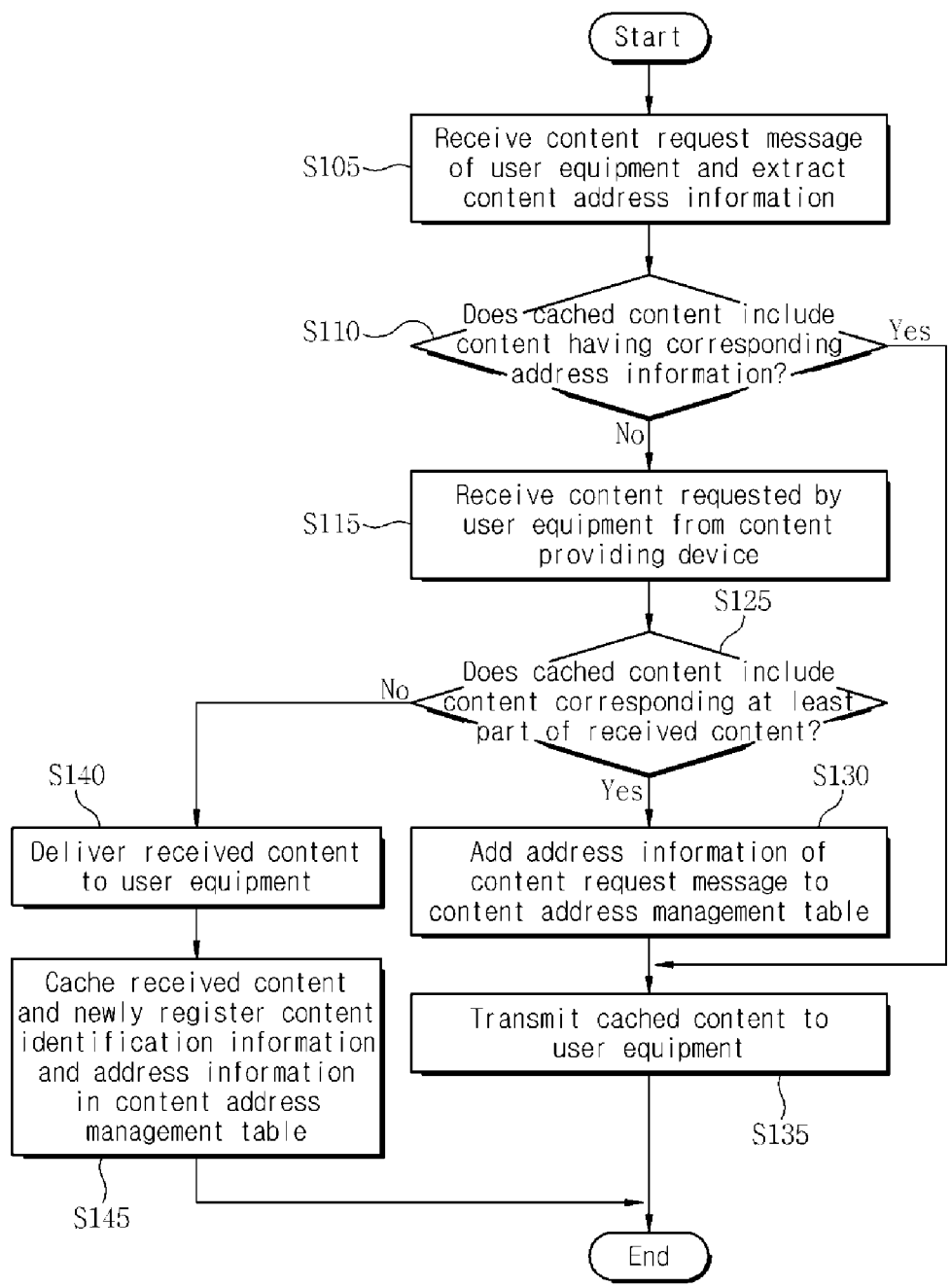
FIG. 5 is a flowchart of a method of providing a content caching service according to at least one embodiment.

FIG. 5 is a flowchart of a method of providing the content caching service according to at least one embodiment.

The content caching service process will be described with reference to FIG. 5 on the assumption that the local caching device 200 according to the least one embodiment includes the content address management table 221 in the controller 220 and manages content identification information corresponding to content cached in the storage unit 230 and one or more content addresses through the content address management table 221. In addition, it is assumed that all data transmitted/received between the user equipment 100 and the content providing device 300 is delivered through the local caching device 200. To achieve this, various schemes are used.

Referring to FIG. 5, the local caching device 200 receives a content request message transmitted from the user equipment 100 to the content providing device 300. The content request message is an HTTP GET message, for example. Upon reception of the content request message, the local caching device 200 extracts content address information included in the content request message (S105).

The local caching device 200 checks whether content cached in the storage unit 230 includes content having address information corresponding to the extracted content address information (S110). That is, the local caching device 200 determines whether, among all content stored in and capable of being cached in the storage unit 230, there is the same or equivalent content matching to the content requested by the user equipment 100 by using the extracted content address information. Here, the content address management table 221 is used. Specifically, the local caching device 200 can search the second field 221b of the content address management table 221 for address information corresponding to the extracted content address information. When the content address management table 221 includes the address information corresponding to the extracted content address information, the local caching device 200 determines that the content cached in the storage unit 230 includes content having address information corresponding to the extracted content address information, that is, there is the same or equivalent content, among all content cached in, or stored in the storage unit 230, matching to the content, requested by the user equipment 100, having address information corresponding to the extracted content address information. On the contrary, when the content address management table 221 does not include the address information corresponding to the extracted content address information, it can be considered that there is not the same or equivalent content, among a plurality of content stored in and capable of being cached in the storage unit 230, matching to the content (i.e., content requested by the user equipment 100) having the address information corresponding to the extracted content address information.

Accordingly, the local caching device 200 receives content requested by the user equipment 100 from the content providing device 300 upon determining that there is no content, among all content cached in the storage unit 230, matching to the content having the address information corresponding to the extracted content address information (S115). This process is performed in such a manner that the local caching device 200 transmits the received content request message to the content providing device 300 and receives the corresponding content (i.e., content requested by the user equipment 100) when the content providing device 300 starts to transmit the corresponding content in response to the content request message.

The local caching device 200 checks whether the corresponding content, matching to the content received from the content providing device 300, is present in the content among all content cached in the storage unit 230 using at least part of the content received from the content providing device 300 as a key (S125). Here, the at least part of the content includes at least one of prefix information of the content, a hash value obtained by processing the prefix information using a predetermined hash function, and metadata including a content length. The prefix length is predetermined. In at least one embodiment of the present disclosure, the local caching device 200 extracts prefix information having a predetermined length from all content cached in the storage unit 230, generates content identification information by hashing the prefix information, and registers the content identification information in the content address management table 221 for step S125. In step S125, the local caching device 200 hashes prefix information having the predetermined length, included in the content received from the content providing device 300, to generate a hash value and check whether the first field 221*a* of the content address management table 221 includes a value corresponding to the hash value. When content identification information having the same value as the hash value is present in the first field 221*a* of the content address management table 221, the local caching device 200 determines that content corresponding to the content requested by the user equipment 100 is cached in the storage unit 230.

Accordingly, upon determining that content corresponding to the at least part of the content received from the content providing device 300 is included in one of all content cached in the storage unit 230 in step S125, the local caching device 200 additionally records address information of the content received from the content providing device 300 in the content address management table 221 as new content address information (i.e., another content address information to be recorded) matched to the content identification information of the content (S130) and transmits the corresponding content cached in the storage unit 230 to the user equipment 100 in place of the content providing device (S135). Steps S130 and S135 are alternatively changed. That is, the process of transmitting the content cached in the storage unit 230 to the user equipment 100 and the process of recording the new content address information in the content address management table 221 are simultaneously performed. Otherwise, the process of transmitting the content cached in the storage unit 230 to the user equipment 100 precedes the process of recording the new content address information in the content address management table 221.

In at least one embodiment of the present disclosure, the local caching device 200 selectively transmits, to the content providing device 300, a message requesting the content providing device 200 to interrupt content transmission (not shown in FIG. 5). Accordingly, the content providing device 300 does not transmit content any more.

Upon determining that there is the corresponding content of all content cached in the storage unit 230 matching to content having address information corresponding to the address information of the content requested by the user equipment 100 in step S110, the local caching device 200 directly performs step S135 to transmit the corresponding content cached in the storage unit 230 to the user equipment 100.

In case where there is no corresponding content of all content cached in the storage unit 230 matching to content corresponding to the at least part of the content received from the content providing device 300 in step S125, the local caching device 200 continuously receives the corresponding content from the content providing device 300 and delivers the received content to the user equipment 100 (S140).

The local caching device 200 caches the received content in the storage unit 230, newly registers content identification information configured using at least part of the content received from the content providing device 300 in the first field 221*a* of the content address management table 221 and records the address information of the received content in the second field 221*b* matched to the newly registered content identification information (S145) simultaneously with step S140 or before or after step S140.

As described above, various embodiments of the present disclosure is applicable to a CDN for a wired or wireless network. The various embodiments of the present disclosure caches some or all content provided by a content providing device through local caching devices distributed in a network and provide cached content to a user equipment through a local caching device instead of the content providing device when the user equipment requests the content corresponding to the cached content. Specifically, the various embodiments of the present disclosure checks whether content having address information corresponding to address information of content requested by the user equipment is cached by using only the address information of the requested content, requests the content providing device to provide the corresponding content to receive part of the content when the content is not cached, and checks whether the content is cached on the basis of the received content, to increase a cache hit rate when the same content is provided for different addresses while ensuring a time required to check whether the same content is present.

In addition, when cached content does not include content having address information corresponding to the address information of the requested content, the present disclosure re-checks whether the content corresponding to the request content is cached on the basis of the content. Accordingly, it is possible to prevent the same content having different addresses from being redundantly stored and prevent waste of storage space. Furthermore, it is possible to prevent redundant transmission of content provided through various addresses by integrating various addresses through which the same content is provided and managing the integrated addresses.

The method of providing content caching service according to the at least one embodiment of the present disclosure is implemented as program commands that can be executed by various computer system and be recorded in any non-transitory, and written to a computer-readable recording medium. The computer-readable recording medium includes programs, data files, data structures, etc. alone or in combination. The program commands written to the medium are designed or configured especially for the present disclosure, or known to those skilled in computer software. Examples of the computer-readable recording medium include magnetic media such as a hard disk, a floppy disk, and a magnetic tape, optical media such as a CD-ROM and a DVD, magneto-optical media such as a floptical disk, and a hardware device configured especially to store and execute a program command, such as a ROM, a RAM, and a flash memory. Examples of a program command include a premium language code executable by a computer using an interpreter as well as a machine language code generated by a compiler. The hardware device is configured to operate as one or more software modules to implement the present disclosure or vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

The detailed description of the preferred embodiments of the present disclosure has been given to enable those skilled in the art to implement and practice the disclosure. Although the disclosure has been described with reference to the various embodiments, those skilled in the art will appreciate that various modifications and variations can be made in the present disclosure without departing from the subject matter, the spirit and scope of the disclosure. Specific terms used in this disclosure and drawings are used for illustrative purposes and not to be considered as limitations of the present disclosure.

What is claimed is:

1. A local caching device, comprising:
a storage unit configured to store some or all content provided by at least one content providing device to at least one user equipment;
a communication interface configured to transmit and receive data between the at least one content providing device and the at least one user equipment; and
a controller configured to
receive a content request message transmitted from the at least one user equipment, the content request message includes content address information,
check whether content corresponding to the content address information is stored in the storage unit,
request the at least one content providing device to transmit the content requested by the at least one user equipment when the requested content corresponding to the content address information is not stored in the storage unit,
receive from the at least one content providing device a part of the requested content, and
check whether content corresponding to at least one portion of the received part of the requested content is stored in the storage unit,
wherein the controller is further configured to generate and store a content address management table,
wherein the content address management table includes
a first field in which content identification information generated using at least a part of content stored in the storage unit is recorded, and
a second field in which one or more addresses of content corresponding to the content identification information are recorded, and
wherein the content identification information includes all of
prefix information having a predetermined length,
a hash value obtained by processing the prefix information using a predetermined hash function, and
metadata of the received content.

2. The local caching device of claim 1, wherein the controller is configured to request the at least one content providing device through the communication interface,
wherein the content requested by the at least one user equipment is content having the content address information corresponding to content address information included in the content request message transmitted from the at least one user equipment to receive the content.

3. The local caching device of claim 1, wherein the controller is configured to
generate the content identification information about the content stored in the storage unit,
register the content identification information in the first field of the content address management table, and
record one or more content address information about the stored content in the second field.

4. The local caching device of claim 1, wherein, when the requested content is stored in the storage unit, the controller is configured to control the requested content stored in the storage unit to be transmitted to the at least one user equipment.

5. The local caching device of claim 1, wherein, when the content corresponding to the at least one portion of the received part of requested content is stored in the storage unit, the controller is configured to add the content address information of the content requested by the at least one user equipment to the content address management table as another address of the content.

6. The local caching device of claim 1, wherein, when the content corresponding to the at least one portion of the received part of the requested content is not stored in the storage unit, the controller is configured to transmit the content received from the content providing device to the at least one user equipment while or before storing the received part of the requested content in the storage unit.

7. The local caching device of claim 1, wherein, when the requested content is stored in the storage unit, the controller is configured to transmit to the content providing device a message requesting the content providing device to interrupt content transmission.

8. The local caching device of claim 1, wherein, upon the content request message from the at least one user equipment is received, the controller is configured to
extract the content address information from the content request message,
compare the extracted content address information or the at least one portion of the received part of the content received from the content providing device with content stored in the storage unit, and
determine whether the content requested by the at least one user equipment is stored.

9. The local caching device of claim 1, wherein the controller is configured to check whether the requested content is stored in the storage unit, by searching the content address management table for content having an address corresponding to the content identification information.

10. The local caching device of claim 1, wherein the controller is configured to compare the at least one portion of the received part of the content received from the at least one content providing device with the content identification information of the content address management table to check whether content corresponding to the at least on portion of the received part of the requested content is stored in the storage unit.

11. A method for providing a content caching service, the method performed by a local caching device, the method comprising:
receive a content request message transmitted from at least one user equipment, the content request message include content address information;
extracting content address information from the content request message transmitted from the at least one user equipment;
check whether content corresponding to the content address information is stored in the storage unit;
requesting a content providing device to provide content having address information corresponding to the extracted content address information when the content corresponding to the content address information is not stored in the local caching device;
receiving from the content providing device a part of the requested content;
checking whether content stored in the local caching device corresponds with at least one portion of the received part of the requested content; and
generating and storing a content address management table,
wherein the content address management table includes
a first field in which content identification information generated using at least a part of content stored in the storage unit is recorded, and a second field in which one or more addresses of content corresponding to the content identification information are recorded, and
wherein the content identification information includes all of
prefix information having a predetermined length,
a hash value obtained by processing the prefix information using a predetermined hash function, and
metadata of the received content.

12. The method of claim 11, further comprising:
checking whether content having the content address information corresponding to the extracted content address information is stored in the local caching device with reference to the content address management table
a first field in which content identification information generated using at least part of the identification information are recorded.

13. The method of claim 11, further comprising:
checking whether content corresponding to the at least one portion of the received part of the content received from the content providing device is stored in the local caching device with reference to the content address management table.

14. The method of claim 11, further comprising
storing the extracted content address information as another address of the received part of the requested content when the content corresponding to the at least one portion of the received part of the requested content is stored in the local caching device.

15. The method of claim 11, further comprising, when the content corresponding to the at least one portion of the received part of the requested content is not stored in the local caching device,
delivering the content received from the content providing device to the user equipment; and
storing the received part of the requested content.

16. The method of claim 11, further comprising
requesting the content providing device to interrupt content transmission when the content corresponding to the at least one portion of the received part of the requested content is stored in the local caching device.

17. The method of claim 11, further comprising
when the content stored in the local caching device corresponds with the at least one portion of the received part of the requested content, transmitting the received part of the requested content to the user equipment.

18. A system for providing a content caching service, comprising
at least one content providing device configured to transmit content requested by at least one user equipment when receiving a request to transmit the content; and
a local caching device configured to
store some or all content provided by at least one content providing device to at least one user equipment,
transmit and receive data between the at least one content providing device and the at least one user equipment,
request the at least one content providing device to transmit the content requested by the at least one user equipment when the entire requested content is not stored in the storage unit,
receive from the at least one content providing device a part of the requested content, and
check whether content corresponding to at least one portion of the received part of the requested content is stored in the storage unit,
wherein the local caching device is further configured to generate and store a content address management table,
wherein the content address management table includes
a first field in which content identification information generated using at least a part of content stored in the storage unit is recorded, and
a second field in which one or more addresses of content corresponding to the content identification information are recorded, and
wherein the content identification information includes all of
prefix information having a predetermined length,
a hash value obtained by processing the prefix information using a predetermined hash function, and
metadata of the received content.

\* \* \* \* \*